(12) United States Patent
Chung

(10) Patent No.: US 7,193,799 B2
(45) Date of Patent: Mar. 20, 2007

(54) APPARATUS AND METHOD OF REMOVING RESONANCE FREQUENCY IN SYSTEM

(75) Inventor: Da-woon Chung, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 582 days.

(21) Appl. No.: 10/155,023

(22) Filed: May 28, 2002

(65) Prior Publication Data

US 2002/0176192 A1 Nov. 28, 2002

(30) Foreign Application Priority Data

May 28, 2001 (KR) ............................... 2001-29410

(51) Int. Cl.
*G11B 5/09* (2006.01)
(52) U.S. Cl. ...................................... 360/46
(58) Field of Classification Search ................. 360/31, 360/75, 73.03, 53, 48
See application file for complete search history.

(56) References Cited

U.S. PATENT DOCUMENTS

| | | | | | |
|---|---|---|---|---|---|
| 4,477,755 | A | * | 10/1984 | Rickert | 360/78.09 |
| 5,285,431 | A | * | 2/1994 | Ogawa | 369/30.15 |
| 5,325,247 | A | * | 6/1994 | Ehrlich et al. | 360/78.09 |
| 5,369,345 | A | * | 11/1994 | Phan et al. | 360/78.09 |
| 5,475,291 | A | * | 12/1995 | Yoshida et al. | 318/568.22 |
| 5,859,742 | A | * | 1/1999 | Takaishi | 360/78.01 |
| 6,014,285 | A | * | 1/2000 | Okamura | 360/78.04 |
| 6,026,418 | A | * | 2/2000 | Duncan, Jr. | 708/309 |
| 6,078,458 | A | * | 6/2000 | Fioravanti et al. | 360/73.03 |
| 6,130,590 | A | * | 10/2000 | Kolsrud | 333/174 |
| 6,153,998 | A | * | 11/2000 | Takakura | 318/560 |
| 6,204,988 | B1 | * | 3/2001 | Codilian et al. | 360/75 |

(Continued)

FOREIGN PATENT DOCUMENTS

JP 5-109217 4/1993

(Continued)

OTHER PUBLICATIONS

NN 77033860, IBM Technical Disclosure Bulletin, Mar. 1977, vol. 19, Issue No. 10, pp. 3860-3862.*
Japanese Office Action for Appln. No. 2002-153967 dated Jul. 21, 2005.

*Primary Examiner*—Wayne Young
*Assistant Examiner*—Glenda P. Rodriguez
(74) *Attorney, Agent, or Firm*—Staas & Halsey LLP

(57) ABSTRACT

An apparatus and a method to remove a resonance frequency of a system in which an unnecessary resonance frequency occurs in a head stack assembly (HSA) having a head for reading/writing data. The HSA is identified and filtered to prevent mechanical damage caused by resonance. The system is artificially excited to identify a potential resonance frequency of the system. The system is designed so that the identified resonance frequency is filtered. Thus, resonance frequency components outside of Nyquist frequency bandwidth of the system can also be identified. Also, the resonance frequency can very easily be identified in a time domain without a complicated calculation process such as an additional frequency transformation process. Coefficients of a programmable filter are updated using the identified resonance frequency to prevent mechanical damage caused by resonance and improve a servo tracking performance and reliability of data.

22 Claims, 7 Drawing Sheets

U.S. PATENT DOCUMENTS

| | | | |
|---|---|---|---|
| 6,219,196 B1 | 4/2001 | Semba et al. | 360/75 |
| 6,417,982 B1* | 7/2002 | Ottesen et al. | 360/77.02 |
| 6,519,496 B1* | 2/2003 | Kawabe et al. | 700/55 |
| 6,574,065 B1* | 6/2003 | Sri-Jayantha et al. | 360/75 |
| 6,643,080 B1* | 11/2003 | Goodner et al. | 360/31 |
| 6,667,845 B1* | 12/2003 | Szita | 360/78.04 |
| 6,785,080 B1* | 8/2004 | Sun et al. | 360/75 |
| 6,927,934 B2* | 8/2005 | Atsumi | 360/77.08 |
| 2002/0003677 A1* | 1/2002 | Takakura | 360/78.09 |
| 2005/0111125 A1* | 5/2005 | Chung | 360/31 |
| 2005/0259348 A1* | 11/2005 | Zhang et al. | 360/77.02 |

FOREIGN PATENT DOCUMENTS

| | | | |
|---|---|---|---|
| JP | 5-313751 | 11/1993 | |
| JP | 08-126370 | 5/1996 | |
| KR | 2000-47652 | 7/2000 | 360/78.09 |
| WO | WO 00/00966 | 1/2000 | |

\* cited by examiner

APPARATUS AND METHOD OF REMOVING RESONANCE FREQUENCY IN SYSTEM

CROSS-REFERENCE TO RELATED APPLICATION

This application claims the benefit of Korean Patent Application No. 2001-29410, filed May 28, 2001, in the Korean Intellectual Property Office, the disclosure of which is incorporated herein by reference.

BACKGROUND OF THE INVENTION

1. Field of the Invention

The present invention relates to an apparatus and a method to remove a resonance frequency of a system, and more particularly, to an apparatus and a method to remove a resonance frequency of a system in which an unnecessary resonance frequency, which otherwise occurs in a head stack assembly (HSA) having a head used to read/write data, is identified and filtered to prevent mechanical damage caused by resonance.

2. Description of the Related Art

In general, a hard disk drive (HDD) is a data storage system that includes a head disk assembly (HDA). The HDA includes instrumental parts, an electric circuit and a head stack assembly (HSA). The HSA generates a harmful resonance that is directly apparent in a position error signal (PES), and which deteriorates the stability of a servo tracking control of the HDD.

To solve this problem, a conventional method analyzes the resonance frequency from a frequency of the PES of the HSA. The analyzed resonance frequency is filtered or screened to remove the resonance frequency. The filters used to remove the analyzed resonance frequency were designed based upon resonance frequency components, which are identified in the PES of a predetermined number of HDDs, in the early development stage and applied to the HDDs. However, the resonance frequency changes according to characteristics of the parts making up the HSA and the characteristics of the assembly of the parts. The change in the resonance frequency between HSAs having such different characteristics cannot be solved using fixed filter coefficients applied to the HDDs.

A method of removing the resonance frequency of HSAs using an adaptive filter has been developed to solve this problem. This method includes identifying the resonance frequency in a frequency domain after a PES undergoes a frequency transformation process. The frequency transformation process includes processes such as a discrete fourier transformation (DFT), a fast fourier transformation (FFT), a wevelet transformation, and the like. The identified resonance frequency is filtered using a programmable filter.

Specifically, as shown in FIG. 1, an apparatus to remove the resonance frequency of the HDD includes an HDA 101, a read/write (RAN) channel processor 102, a controller 103, a resonance frequency identifier 104, a programmable filter 105, and a voice coil motor (VCM) driver 106. Here, the R/W channel processor 102 includes a pre-amplifier.

The R/W channel processor 102 amplifies signals read from a transducer of an HSA included in the HDA 101. Burst signals corresponding to servo information are separated from the amplified signals and operated by a servo control algorithm to generate a PES. If a command is input to carry out a process of identifying the resonance frequency of the HSA after completion of the whole process of manufacturing the HDD, the controller 103 applies a control signal CT to analyze the resonance frequency. The control signal CT is applied to the resonance frequency identifier 104. Also, the controller 103 generates a control output signal UK to drive a VCM based on a speed error signal and an acceleration error signal. The speed error signal and the acceleration error signal are analyzed by the PES and the servo control algorithm.

When the resonance frequency identifier 104 receives the control signal CT, the resonance frequency identifier 104 performs the frequency transformation to the PES and identifies the resonance frequency fr in a frequency domain. Once identified, the programmable filter 105 resets coefficients thereof, filters the control output signal UK, outputs the control output signal UK to the VCM driver 106, and drives the VCM in order to remove the identified resonance frequency fr.

However, the resonance frequency identifier 104 limits a frequency bandwidth which can be identified from the PES due to a servo sampling ratio of the HDD. In other words, the frequency identified by a process of frequency transformation to the PES is limited within the Nyquist frequency, which is half of a servo sampling frequency. If an aliasing phenomenon occurs due to a sampling effect and resonance frequency components fr1 and fr2 occur within a range between the Nyquist frequency and the sampling frequency, the resonance frequency components fr1 and fr2 are identified as resonance frequencies fr1' and fr2'. The resonance frequencies fr1' and fr2' exist within the Nyquist frequency fn due to a mirroring phenomenon as shown in FIG. 7. Since the frequencies fr1' and fr2' are not the correct resonance frequencies, the programmable filter 105 cannot accurately remove the resonance occurring in the HSA since the programmable filter 105 is set to correspond to the misidentified resonance frequencies fr1' and fr2'.

SUMMARY OF THE INVENTION

To solve the above and other problems, it is an object of the present invention to provide an apparatus to accurately identify a resonance frequency existing beyond a Nyquist frequency bandwidth, in a time domain, which is a potential in a system, by applying an excitation signal having frequency components up to a sampling frequency bandwidth to a data storage system and removing the resonance frequency of the system using a programmable filter.

It is another object of the present invention to provide a method of identifying a resonance frequency of a system.

Additional objects and advantages of the invention will be set forth in part in the description which follows and, in part, will be obvious from the description, or may be learned by practice of the invention.

Accordingly, to achieve the above and other objects, an apparatus to remove a resonance frequency of a system according to an embodiment of the invention includes a frequency generator, a resonance detector, and a programmable filter, where the frequency generator generates an excitation signal to excite the system and applies the excitation signal to the system, the resonance detector detects the resonance frequency from a signal responding to the excitation signal in the system, and the programmable filter removes the resonance frequency detected in the resonance detector.

According to another embodiment of the invention, a method of removing a resonance frequency of a system includes generating an excitation signal to excite the system, applying the excitation signal to the system, detecting the resonance frequency from a signal responding to the excitation signal in the system, and removing the detected resonance frequency.

BRIEF DESCRIPTION OF THE DRAWINGS

The above and other objects and advantages of the present invention will become more apparent and more readily appreciated by describing in detail preferred embodiments thereof with reference to the attached drawings in which.

DETAILED DESCRIPTION OF THE EMBODIMENTS

Figure 1:
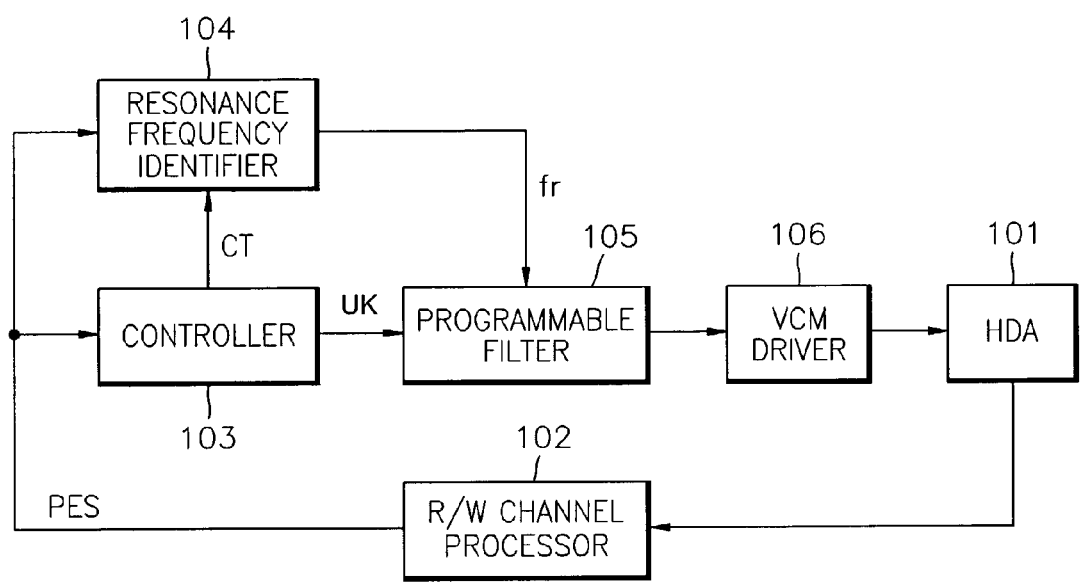
FIG. 1 is a configuration diagram of a conventional apparatus to remove a resonance frequency of an HDD.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
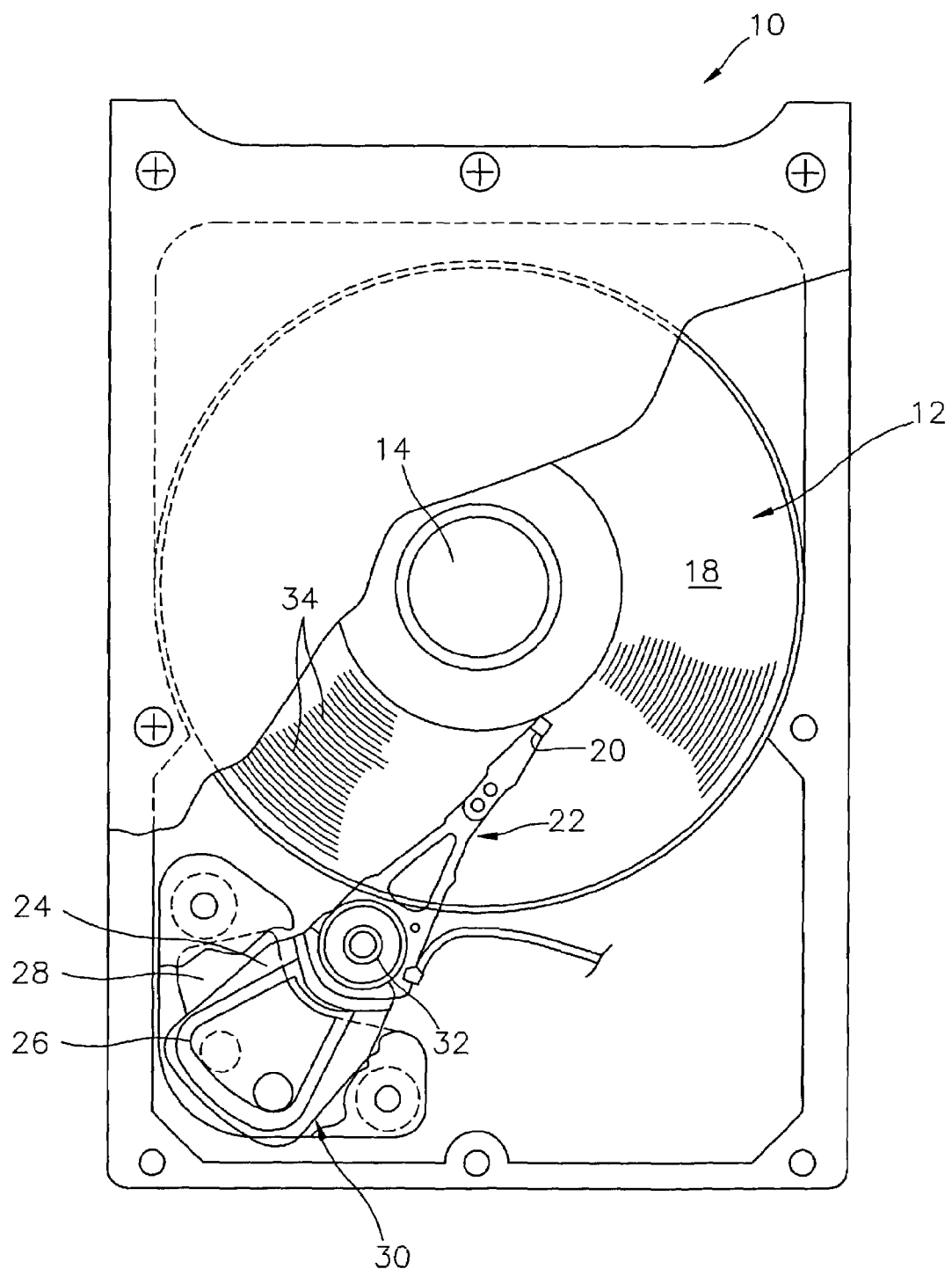
FIG. 2 is a plan view of an HDD according to an embodiment of the present invention.

FIG. 2 is a plan view of a hard disk drive (HDD) 10 according to an embodiment of the present invention. The hard disk drive 10 includes at least one magnetic disk 12, which is rotated by a spindle motor 14. The hard disk drive 10 also includes a transducer (not shown), which is located adjacent to a disk surface 18.

The transducer can sense and magnetize a magnetic field of the magnetic disk 12 to read or record data from or to the magnetic disk 12, which is being rotated by the spindle motor 14. In general, the transducer is in contact with the disk surface 18. The transducer is described as a single transducer, but it is understood that the transducer often includes a writing transducer to magnetize the magnetic disk 12 and a reading transducer, which is separate from the writing transducer, to sense the magnetic field of the magnetic disk 12. The reading transducer is a magneto-resistive (MR) device according to an embodiment of the invention. Further, it is understood that other types of transducers can be used using the reading or writing transducers individually or using a unitary transducer performing both reading and writing operations.

The transducer is integrated into a head 20 according to an embodiment of the invention. The head 20 generates an air bearing between the transducer and the disk surface 18. The head 20 is part of a head stack assembly (HSA) 22. The HSA 22 is attached to an actuator arm 24 having a voice coil 26. The voice coil 26 is adjacent to a magnetic assembly 28 which includes a voice coil motor (VCM) 30. Current supplied to the voice coil 26 generates torque, which rotates the actuator arm 24 with respect to a bearing assembly 32. The rotation of the actuator arm 24 moves the transducer across the disk surface 18.

Information is generally stored in an annular track 34 of the magnetic disk 12. As shown in FIG. 2, each track 34 generally includes a plurality of sectors. Each sector includes data fields and identification fields. The identification field includes a gray code to identify a sector and a track (cylinder). To access another track, the transducer moves across the disk surface 18 to read or write information on the another track.

Figure 3:
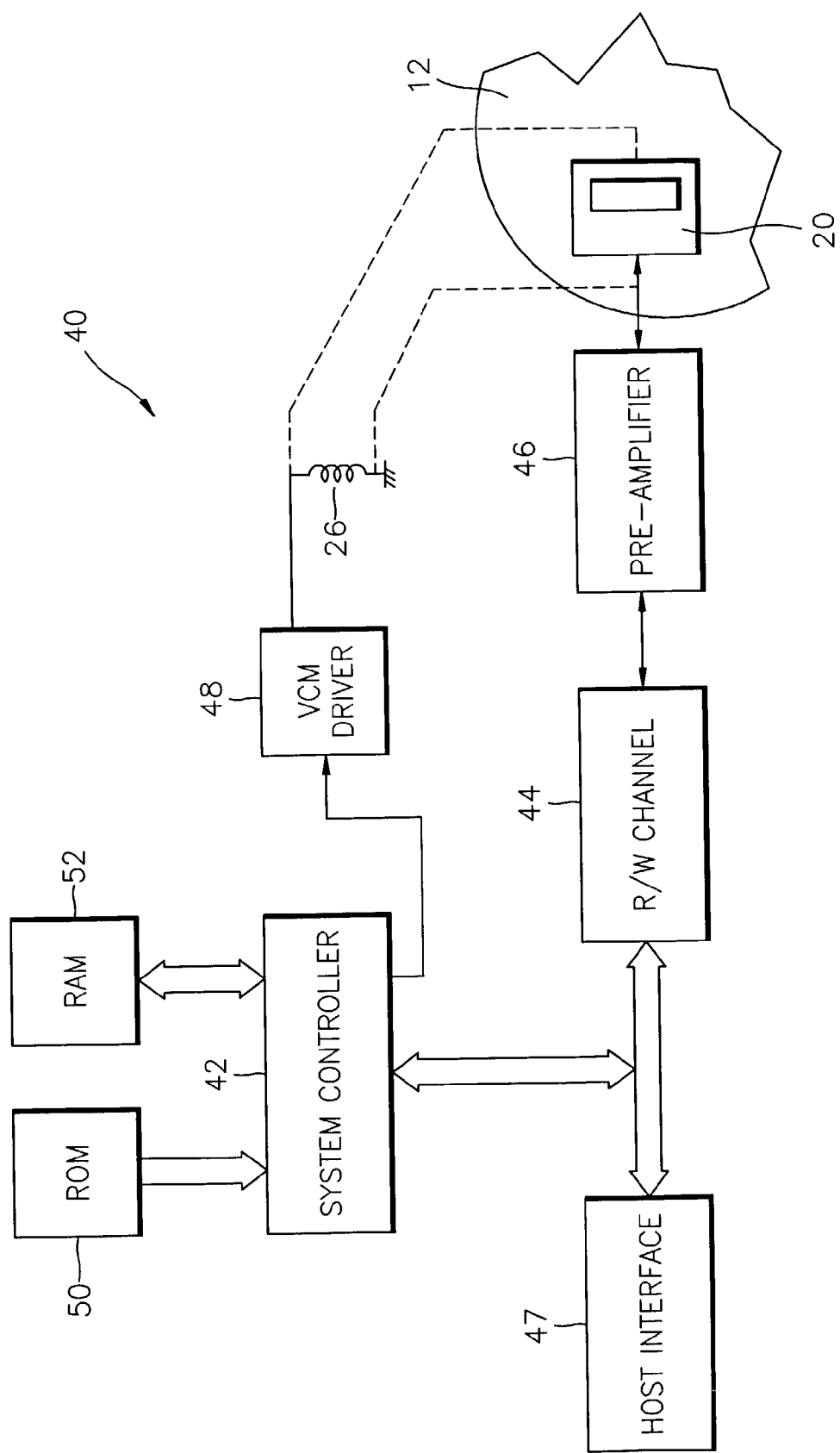
FIG. 3 is a circuit diagram of a system to control an HDD according to an embodiment of the present invention.

FIG. 3 shows a system 40 to control the hard disk drive 10. The system 40 includes a system controller 42 which is connected to the head 20 via a read/write (R/W) channel circuit 44 and a pre-amplifier circuit 46. While not required in all aspects of the invention, the system controller 42 may be a digital signal processor (DSP), a microprocessor, a microcontroller, and the like implementing instructions encoded on a computer readable medium. The system controller 42 supplies a control signal to the R/W channel circuit 44 to read information from the disk 12 or write information on the disk 12. Information is generally transmitted from the R/W channel circuit 44 to a host interface circuit 47. The host interface circuit 47 includes a buffer memory and a control circuit which permits the hard disk drive 10 to interface with another system such as a personal computer.

The system controller 42 is connected to a voice coil motor (VCM) driver 48, which supplies a driving current to the voice coil 26. The system controller 42 supplies a control signal to the VCM driver 48 to control the excitation of the VCM driver 48 and the motion of the transducer. The system controller 42 is connected to a nonvolatile memory, such as a read only memory (ROM) or a flesh memory device 50, and a random access memory (RAM) device 52. The memory devices 50 and 52 individually or in combination include commands and data used by the system controller 42 to execute a software routine. The software routine includes a seek routine which moves the transducer from one track to another track. The seek routine includes a servo control routine to guarantee the movement of the transducer to an accurate track. For example, the memory device 50 includes acceleration, velocity, and position trajectory equations.

Figure 4:
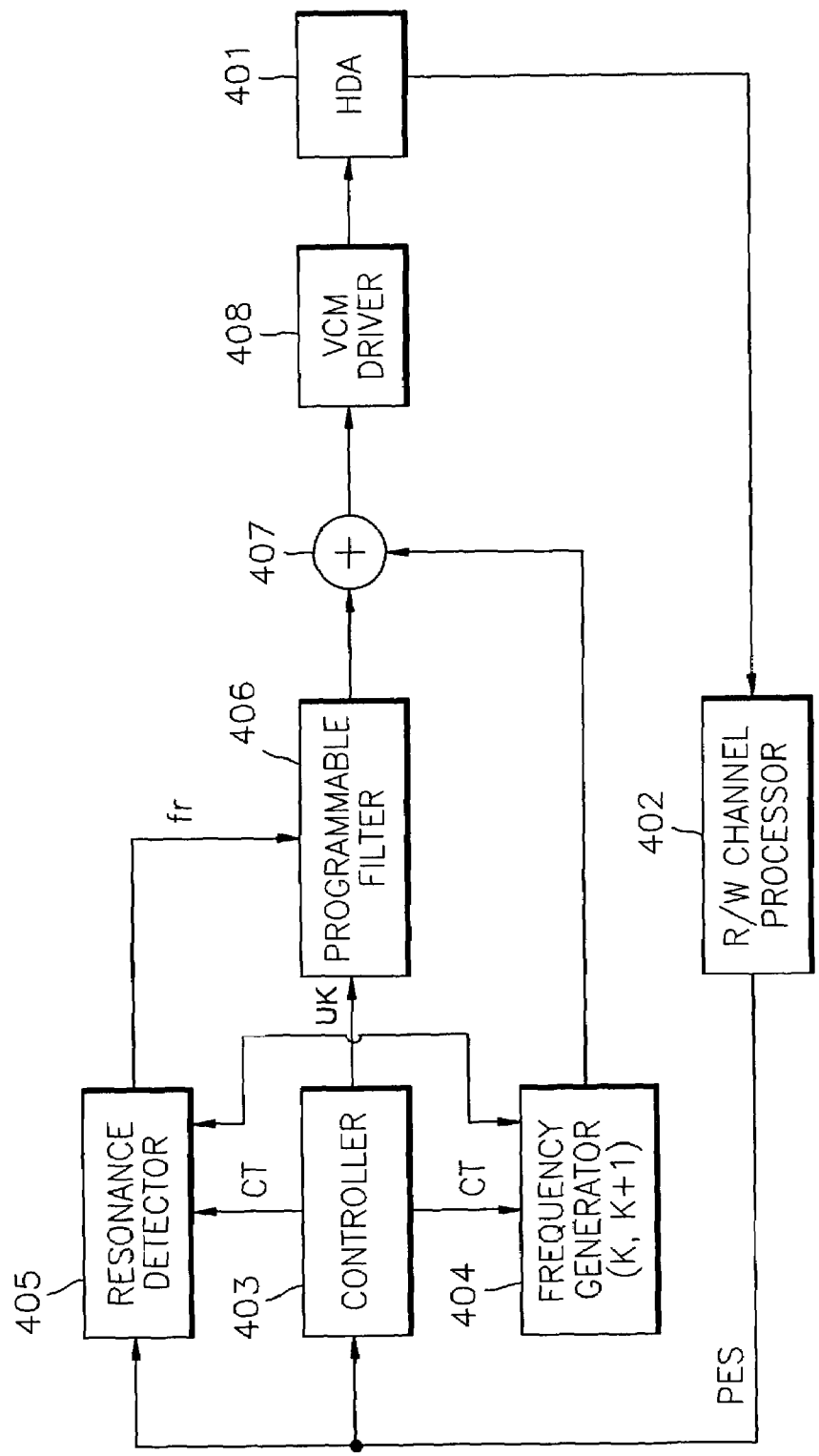
FIG. 4 is a configuration diagram of an apparatus to remove a resonance frequency of a system according to an embodiment of the present invention.

FIG. 4 shows a configuration of an apparatus to remove a resonance frequency of a system of components of the HDD 10 related to an embodiment the present invention. While other components may be included, only those components related to the removal of the resonance frequency are shown in FIG. 4. As shown in FIG. 4, the apparatus includes a head disk assembly (HDA) 401, a read/write (R/W) channel processor 402, a controller 403, a frequency generator 404, a resonance detector 405, a programmable filter 406, a mixer 407, and a VCM driver 408. Here, the R/W channel processor 402 represents the R/W channel circuit 44 having the pre-amplifier 46 shown in FIG. 3. The controller 403 and the programmable filter 406 represent circuits and/or software routines of the system controller 42 shown in FIG. 4.

The R/W channel processor 402 amplifies signals read from a transducer of a head stack assembly (HSA) 22 included in the HDA 401. Burst signals corresponding to servo information are separated from the amplified signals and operated by a servo control algorithm to generate a position error signal (PES). The controller 403 applies a control signal CT to the frequency generator 404 to generate a frequency which excites the HSA 22 when a resonance frequency identification mode set command is input. The resonance frequency identification mode set command is a command to carry out a process of identifying the resonance frequency of the HSA after the whole process of manufacturing the HDD is completed. Also, the controller 403 generates a control output signal UK to drive the VCM 30 based on a speed error signal and an acceleration error signal, which are analyzed by the PES and the servo control algorithm.

The frequency generator 404 generates an excitation signal, which has frequency components up to a sampling frequency of the system, to artificially excite the system. The excitation signal may use any one of a sine wave, a cosine wave, or a combination of the sine wave and the cosine wave. The strength of the excitation signal is set to the strength sufficient to cause resonance when exciting the system. Also, the strength of the excitation signal is determined within a range sufficient to perform servo seeking and following operations and to normally obtain the PES from a signal output from the system.

Signal sampling two or more times the number of servo sampling is necessary to generate a signal having frequency components up to a sampling frequency bandwidth when the frequency generator 404 generates the excitation signal. In an embodiment of the present invention, the signal is generated by a multi-rate method. The multi-rate method is a signal generation method by which a signal to drive an actuator is mixed with another signal, where the another signal is synchronized by a servo sampling cycle and a signal output as half of the servo sampling cycle and output.

In other words, according to an embodiment of the invention, the frequency generator 404 generates a Nyquist frequency as the maximum excitation frequency when the excitation signal is input to the system every servo sampling cycle T. The excitation signal is generated up to the sampling frequency bandwidth if the excitation signal is input to the system for half (T/2) of the servo sampling cycle using the multi-rate method. The frequency generator 404 increases the frequency of the excitation signal at specified intervals within possible limits to generate the resonance.

The excitation signal generated in the frequency generator 404 is input to the mixer 407 and mixed with a signal UK output from the controller 403 via the programmable filter 406. The mixed signal is applied to the VCM driver 408 and a driving current of the VCM 30, which is transformed into a current signal in the VCM driver 408, is applied to the VCM 30 of the HDA 401. As a result, the actuator is driven by the driving current applied to the VCM 30 and vibrated by the frequency generated in the frequency generator 404.

Figure 6:
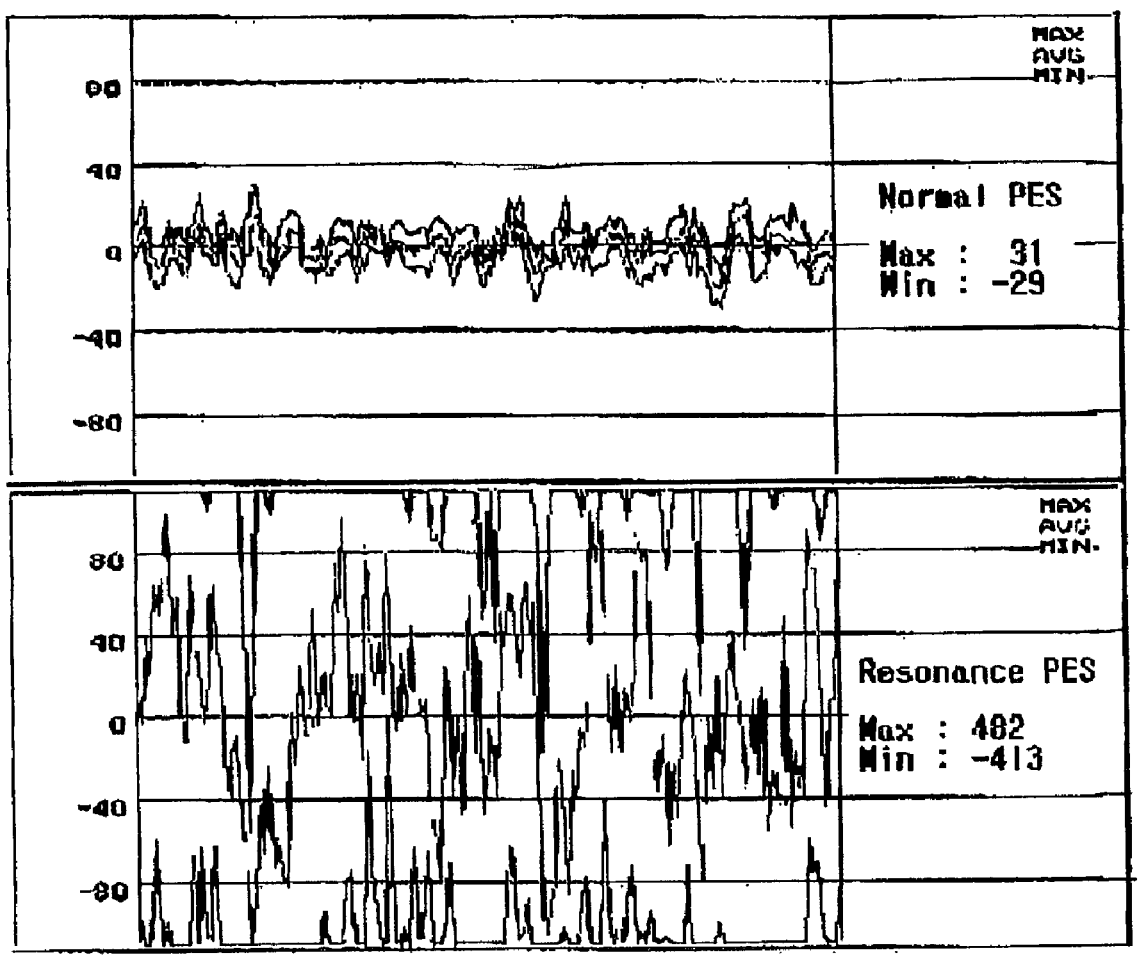
FIG. 6 is a waveform diagram of a PES depending on whether or not resonance occurs.
Figure 7:
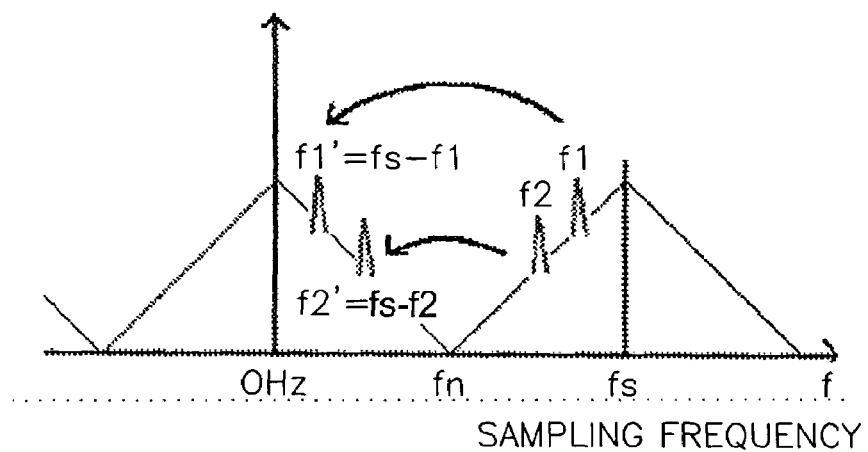
FIG. 7 is a graph explaining a mirroring effect.

The PES has the magnitude three times more than normal PES when resonance occurs. The PES also increases in proportion to the strength of the excitation signal which serves as an excitation source when resonance occurs. As a result, the excitation signal applied to the HDA 401 is reflected in the output PES. The PES sharply increases as shown in FIG. 6 if the excitation signal generates resonance.

The resonance detector 405 determines whether or not resonance occurs in the HDA 401 due to the excitation signal, using the magnitude of the PES. In other words, a magnitude of the PES becomes 482 mV (94.1% of track pitch) at its maximum as shown in FIG. 6 if resonance occurs. Otherwise, the maximum is 31 mV (6% of track pitch) at its maximum. As a result, it is seen that the magnitude of the PES varies depending on whether or not resonance occurs. Thus, the resonance detector 405 determines that resonance occurs if the magnitude of the PES is over a reference value used to detect resonance. Here, the resonance detector 405 senses a frequency fr due to the excitation signal generated in the frequency generator 404 as the resonance frequency of the HSA 22. The resonance detector 405 outputs the resonance frequency of the HSA to the programmable filter 406. The reference value to determine the resonance frequency in the resonance detector 405 may be determined by an experiment.

Figure 8:
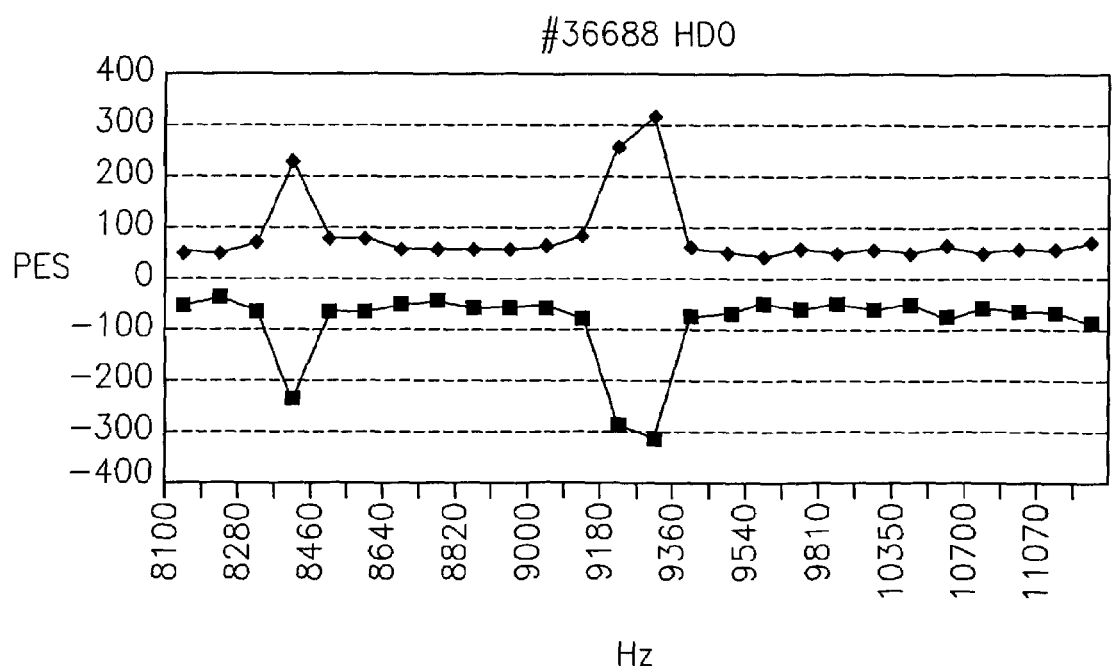
FIG. 8 is a graph showing changes in a PES according to changes in excitation frequency.

FIG. 8 shows the magnitude of a PES based on changes in frequency of an excitation signal. As shown in FIG. 8, resonance occurs in frequencies of 8.3 and 9.3 KHz.

The programmable filter 406 updates coefficients thereof, which were previously set as default values, as coefficients to remove the detected resonance frequency fr. The programmable filter 406 designs bandwidth, which can be filtered, beyond the resolving power of the frequency generator 404 in consideration of a gain margin and a phase margin of the system.

Figure 5:
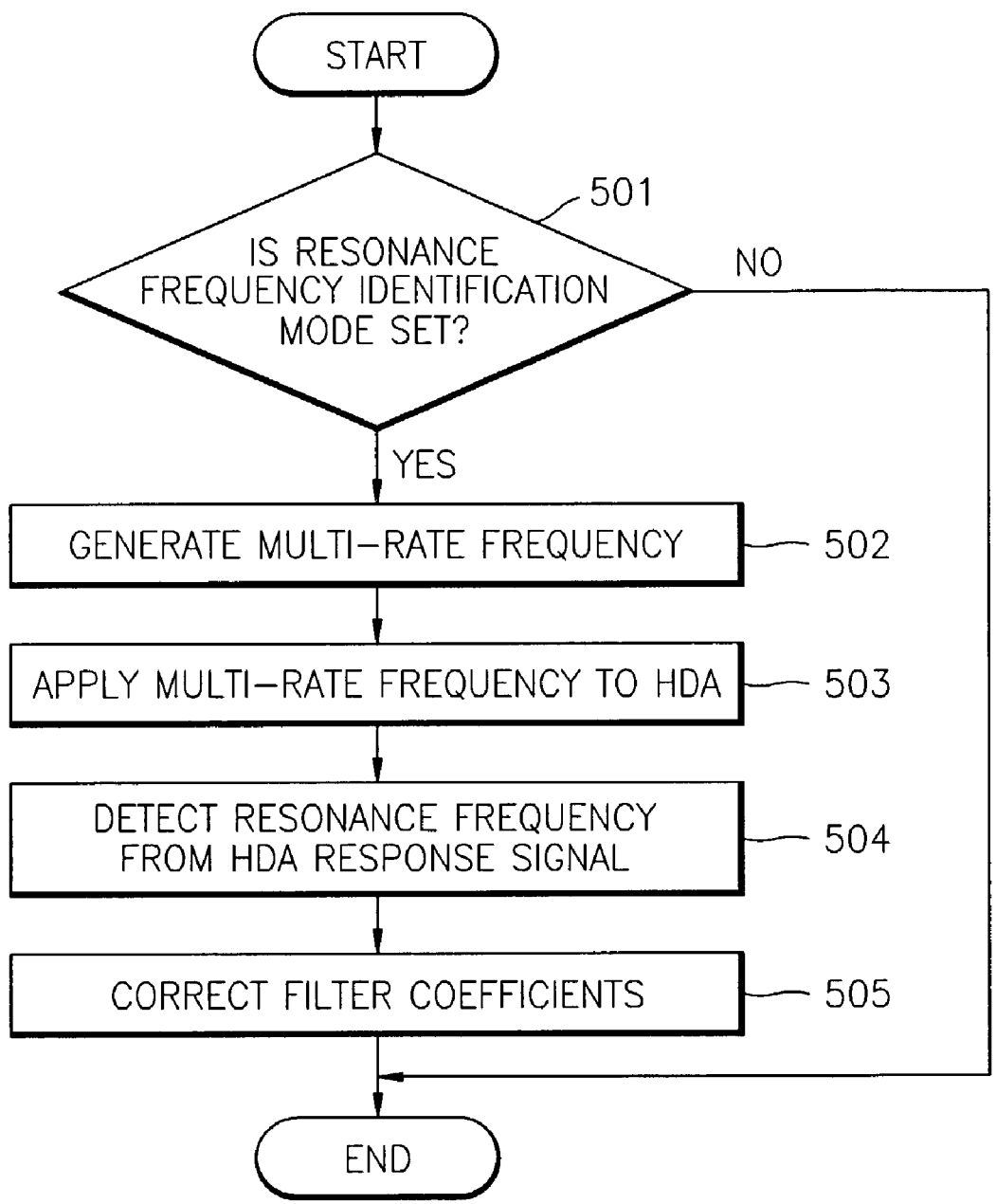
FIG. 5 is a flowchart of a method of removing a resonance frequency of a system according to an embodiment of the present invention.

A method of removing resonance frequency of a system according to an embodiment of the present invention will be described in detail with reference to FIG. 5. The controller 403 determines whether or not a command to set a resonance frequency identification mode of the HSA 22 is input via the host interface 47 (operation 501). The resonance frequency identification mode is generally set in a process of manufacturing a HDD 10, but a user can directly set the resonance frequency identification mode if necessary.

The controller 403 controls the frequency generator 404 to generate an excitation signal to carry out the resonance frequency identification mode if the controller 403 receives the command to set the resonance frequency identification mode (operation 502). Here, the excitation signal is generated by a multi-rate method by which a signal to drive an actuator is mixed with another signal, where the another signal is synchronized by a servo sampling cycle and a signal output as half of the servo sampling cycle and then output. In other words, the maximum frequency of the excitation signal generated every servo sampling cycle T is the Nyquist frequency. The maximum frequency of the excitation signal generated every half of the servo sampling cycle T/2 includes the sampling frequency bandwidth. Also, the generated excitation signal increases frequency at specified intervals within possible limits to generate the resonance (operation 502).

The excitation signal generated by the multi-rate method is applied to the HDA 401 (operation 503). A method of mixing the VCM driving current with the excitation signal is an example of the method of applying the excitation signal to the HDA 401. The HSA 22 included in the HDA 401 is driven by the current applied to the VCM 30 and is vibrated by the frequency generated in the frequency generator 404. A signal responding to the excitation signal is detected from the HAD 401. A PES is used as the response signal. Thus, the resonance detector 405 determines whether or not resonance occurs due to the excitation signal using the PES and detects the frequency of the excitation signal at a point in time when resonance occurs as the resonance frequency (operation 504).

The coefficients of the programmable filter 406 of the HDD are updated to filter the detected resonance frequency (operation 505).

As described above, according to the present invention, a system is artificially excited to identify a potential resonance frequency of the system. The system is designed so that the identified resonance frequency is filtered. Thus, the resonance frequency components over the Nyquist frequency bandwidth of the system can also be identified. Also, the resonance frequency can very easily be identified in a time domain without a complicated calculation process, such as an additional frequency transformation process. Coefficients of a programmable filter are updated using the identified resonance frequency to prevent mechanical damage caused by resonance and improve a servo tracking performance and reliability of data.

The present invention can be executed as a method, an apparatus, or a system and the like. The elements of the present invention are code segments which execute necessary tasks if the present invention is executed as software. Programs or code segments may be stored in a processor-readable medium or may be transmitted by a computer data signal combined with a carrier wave over a transmission medium or communication network. The processor readable medium may include any medium which is capable of storing or transmitting information. The processor readable medium includes an electronic circuit, a semiconductor memory device, a ROM, a flash memory, an erasable ROM (EROM), a floppy disk, an optical disk, a hard disk, an optical fiber medium, a radio frequency (RF) net, and the like. The computer data signal includes any signal which may be transmitted over a transmission medium such as an electronic network channel, an optical fiber, air, electromagnetic field, an RF network, and the like.

Specific embodiments described with reference to the attached drawings must be understood only as examples of the present invention and must not be interpreted as limiting the scope of the present invention. The present invention can be modified into various other forms in the art without departing from the spirit and scope of the invention as defined by the accompanying claims and equivalents thereof. Therefore, it is obvious that the present invention is not limited to the specific structure and arrangement shown and described above.

What is claimed is:

1. An apparatus to remove a resonance frequency of a system, the apparatus comprising:
    a frequency generator to generate an excitation signal based on a sampling rate with which a detector samples a signal used to control the system, and to apply the excitation signal to the system;
    a resonance detector to detect the resonance frequency from a response signal that is responsive to the excitation signal being applied to the system; and
    a programmable filter to remove the detected resonance frequency,
    wherein the generated excitation signal has frequency components up to a servo sampling frequency bandwidth of a servo control used in the system,
    wherein said frequency generator increases a frequency of the excitation signal at predetermined intervals beginning at a bandwidth at or below a Nyquist frequency and increased to at least a sampling frequency bandwidth, and
    wherein said resonance detector determines a frequency of the excitation signal as the resonance frequency when a magnitude of the response signal exceeds a critical value in a time domain without a frequency transformation of the response signal.

2. The apparatus of claim 1, wherein the response signal is a position error signal of a hard disk drive.

3. An apparatus to remove a resonance frequency of a system, the apparatus comprising:
    a frequency generator to generate an excitation signal based on a sampling rate with which a detector samples a signal used to control the system, and to apply the excitation signal to the system;
    a resonance detector to detect the resonance frequency from a response signal that is responsive to the excitation signal being applied to the system: and
    a programmable filter to remove the detected resonance frequency,
    wherein the generated excitation signal has frequency components up to a servo sampling frequency bandwidth of a servo control used in the system,
    wherein said frequency generator increases a frequency of the excitation signal at predetermined intervals beginning at a bandwidth at or below a Nyquist frequency and increased to at least a sampling frequency bandwidth,
    wherein said frequency generator generates an excitation signal comprising a cycle of one of a servo sampling cycle of a servo control used in the system and another signal that is half of the servo sampling cycle, and
    wherein the excitation signal is mixed with a driving signal to drive the servo control using a multi-rate method.

4. A method of removing a resonance frequency of a system, the method comprising:
    generating an excitation signal based on a sampling rate with which a detector samples a signal used to control the system;
    applying the excitation signal to the system;
    detecting the resonance frequency from a response signal that is responsive to the excitation signal being applied to the system; and
    removing the detected resonance frequency,
    wherein the excitation signal has frequency components up to a servo sampling frequency bandwidth of a servo control used in the system,
    wherein said generating the excitation signal further comprises increasing a frequency of the excitation signal at predetermined intervals beginning at a bandwidth at or below a Nyquist frequency of the system and increasing up to at least a sampling frequency bandwidth, and
    wherein said detecting the resonance frequency further comprises determining a frequency of the excitation signal to be the resonance frequency when a magnitude of the response signal of the system exceeds a critical value in a time domain without a frequency transformation of the response signal.

5. The method of claim 4, wherein said removing the detected resonance frequency is performed by a programmable filter which is designed to remove the detected resonance frequency.

6. The method of claim 4, wherein the response signal of the system is a position error signal of a hard disk drive.

7. A method of removing a resonance frequency of a system, the method comprising:
    generating an excitation signal based on a sampling rate with which a detector samples a signal used to control the system;
    applying the excitation signal to the system;
    detecting the resonance frequency from a response signal that is responsive to the excitation signal being applied to the system; and
    removing the detected resonance frequency,
    wherein the excitation signal has frequency components up to a servo sampling frequency bandwidth of a servo control used in the system,
    wherein said generating the excitation signal further comprises increasing a frequency of the excitation signal at predetermined intervals beginning at a bandwidth at or below a Nyguist freguency of the system and increasing up to at least a sampling frequency bandwidth, and wherein the excitation signal includes a cycle at or between a servo sampling cycle of a servo control used in the system and half of the servo sampling cycle is combined with a driving signal that drives the servo control.

8. A recording and/or reproducing apparatus to record and/or reproduce data with respect to a recording medium, comprising:

a head to record and/or reproduce the data with respect to the recording medium;

a driver to drive said head to record and/or reproduce the data with respect to the recording medium;

a frequency generator to generate an excitation signal to excite the recording and/or reproducing apparatus at a selected frequency;

a processor to process the data to be recorded and/or reproduced using said head, and to process a response signal related to the generated excitation signal;

a resonance detector to analyze the processed response signal to determine whether the generated excitation signal corresponds to a resonance frequency;

a programmable filter to filter the detected resonance frequency so as to prevent resonance in the recording and/or reproducing apparatus; and a controller to control said frequency generator and said resonance detector to detect the resonance frequency, and to control said driver to drive said head, wherein said frequency generator increases a frequency of the excitation signal at predetermined intervals beginning at a bandwidth at or below a Nyquist frequency and increased to at least a sampling frequency bandwidth, and wherein said resonance detector determines a frequency of the excitation signal as the resonance frequency when a maqnitude of the processed response signal exceeds a critical value in a time domain without a frequency transformation of the processed response signal.

9. The recording and/or reproducing apparatus of claim 8, wherein said controller generates a drive signal to control said driver to drive said head, and said recording and/or reproducing apparatus further comprises a mixer to mix the generated excitation signal from said frequency generator with the generated drive signal from said controller.

10. The recording and/or reproducing apparatus of claim 9, wherein said controller generates the drive signal according to a speed error signal and an acceleration signal.

11. The recording and/or reproducing apparatus of claim 10, wherein:

said processor generates a position error signal including the speed error signal and the acceleration signal, and said controller and said resonance detector to receive the generated position error signal and to analyze the received position error signal to generate the drive signal.

12. The recording and/or reproducing apparatus of claim 8, wherein:

said frequency generator generates the excitement signal including frequency components, said drive comprises a servo control to control a position of said head, the servo control having a servo sampling frequency, and one of the frequency components is at or between a Nyquist frequency and the servo sampling frequency.

13. The recording and/or reproducing apparatus of claim 8, wherein said drive comprises a servo control to control a position of said head, the servo control having a servo sampling frequency.

14. A recording and/or reproducing apparatus of to record and/or reproduce data with respect to a recording medium, comprising:

a head to record and/or reproduce the data with respect to the recording medium;

a driver to drive said head to record and/or reproduce the data with respect to the recording medium;

a frequency generator to generate an excitation signal to excite the recording and/or reproducing apparatus at a selected frequency;

a processor to process the data to be recorded and/or reproduced using said head, and to process a response signal related to the generated excitation signal;

a resonance detector to analyze the processed response signal to determine whether the generated excitation signal corresponds to a resonance frequency;

a programmable filter to filter the detected resonance frequency so as to prevent resonance in the recording and/or reproducing apparatus; and a controller to control said frequency generator and said resonance detector to detect the resonance frequency, and to control said driver to drive said head, wherein said frequency generator increases a frequency of the excitation signal at predetermined intervals beginning at a bandwidth at or below a Nyquist frequency and increased to at least a sampling frequency bandwidth, wherein said processor generates a position error signal, and wherein said resonance detector compares a magnitude of the generated position error signal with a reference value to determine whether the generated excitation signal corresponds to the resonance frequency.

15. The recording and/or reproducing apparatus of claim 14, wherein:

said resonance detector detects when the magnitude of the position error signal is three or more times the reference value to determine whether the generated excitation signal corresponds to the resonance frequency.

16. A computer readable medium tangibly encoded with processing instructions for implementing a method of detecting a resonance frequency in a recording and/or reproducing apparatus as performed by a computer, the method comprising:

generating an excitation signal of a frequency at or between a Nyquist frequency and a servo sampling frequency, where the servo sampling frequency corresponds to a servo control of a driver used to drive a head used to record and/or reproduce data with respect to a recording medium;

applying the generated excitation signal to the head;

detecting a response signal generated by the head in response to the applied excitation signal; and determining from the detected response signal whether the frequency of the generated and applied excitation signal corresponds to the resonance frequency for the driver, wherein said generating the excitation signal further comprises increasing a frequency of the excitation signal at predetermined intervals beginning at a bandwidth at or below a Nyquist frequency of the system and increasing up to at least a sampling frequency bandwidth, wherein said determining from the detected response signal whether the frequency of the generated and applied excitation signal corresponds to the resonance frequency is performed in a time domain, wherein said determining from the detected response signal whether the frequency of the generated and applied excitation signal corresponds to the resonance frequency is performed in the time domain without the response signal having been transformed into a frequency domain, and wherein when a magnitude of the detected response signal exceeds a critical value in the time domain without frequency transformation, the detected response signal is determined to be the resonance frequency.

17. The computer readable medium of claim 16, further comprising setting a programmable filter to filter the resonance frequency to prevent resonance of the driver when the frequency of the excitation signal is determined to correspond to the resonance frequency.

18. The computer readable medium of claim 16, further comprising:

generating a driving signal to drive the driver to record and/or reproduce data with respect to the recording medium, and mixing the generated excitation signal with the drive signal to provide a mixed signal, wherein said applying the generated excitation signal comprises applying the mixed signal so as to drive the driver in accordance with the driving signal and to vibrate the driver in accordance with the frequency of the generated excitation signal.

19. The computer readable medium of claim 16 wherein the response signal is a position error signal generated by a servo control algorithm.

20. A computer readable medium tangibly, encoded with processing instructions for implementing a method of detecting a resonance freguency in a recording and/or reproducing apparatus as performed by a computer, the method comprising:

generating an excitation signal of a frequency at or between a Nyquist frequency and a servo sampling frequency, where the servo samplinq frequency corresponds to a servo control of a driver used to drive a head used to record and/or reproduce data with respect to a recording medium;

applying the generated excitation signal to the head;

detecting a response signal generated by the head in response to the applied excitation signal; and determining from the detected response signal whether the frequency of the generated and applied excitation signal corresponds to the resonance frequency for the driver, wherein said generating the excitation signal further comprises increasing a frequency of the excitation signal at predetermined intervals beginning at a bandwidth at or below a Nyguist frequency of the system and increasing up to at least a sampling frequency bandwidth, and wherein said determining from the detected response signal whether the frequency of the generated and applied excitation signal corresponds to the resonance frequency comprises determining whether the response signal has a magnitude at or above three times a reference value.

21. The computer readable medium of claim 20, wherein the response signal is a position error signal generated by a servo control algorithm.

22. An apparatus to remove a resonance frequency of a system, the apparatus comprising:

a controller receiving a command to set a resonance frequency identification mode;

a frequency generator controlled by the controller to generate an excitation signal based on a sampling rate with which a detector samples a signal used to control the system, and to apply the excitation signal to the system after the controller receives the command to set a resonance frequency identification mode;

a resonance detector to detect the resonance frequency from a response signal that is responsive to the excitation signal being applied to the system; and a programmable filter to remove the detected resonance frequency, wherein the generated excitation signal has frequency components up to a servo sampling frequency bandwidth of a servo control used in the system, wherein said frequency qenerator increases a frequency of the excitation signal at predetermined intervals beqinninq at a bandwidth at or below a Nyquist frequency and increased to at least a sampling frequency bandwidth after the controller receives the command to set a resonance frequency identification mode, and wherein said resonance detector determines a frequency of the excitation signal as the resonance frequency when a maqnitude of the response signal exceeds a critical value in a time domain without a frequency transformation of the response signal.

* * * * *

UNITED STATES PATENT AND TRADEMARK OFFICE
CERTIFICATE OF CORRECTION

PATENT NO. : 7,193,799 B2  
APPLICATION NO. : 10/155023  
DATED : March 20, 2007  
INVENTOR(S) : Da-woon Chung It is certified that error appears in the above-identified patent and that said Letters Patent is hereby corrected as shown below:

Column 8, Line 3, change "system:" to --system;--.

Column 9, Line 1, change "Nyguist freguency" to --Nyquist frequency--.

Column 9, Line 37, change "maqnitude" to --magnitude--.

Column 10, Line 6, after "apparatus" delete "of".

Column 10, Line 31, change "Nyguist" to --Nyquist--.

Column 11, Line 34, after "16" insert --,--.

Column 11, Line 37, after "tangibly" delete ",".

Column 11, Line 39, change "freguency" to --frequency--.

Column 11, Line 44, change "samplinq" to --sampling--.

Column 12, Line 8, change "Nyguist" to --Nyquist--.

Column 12, Line 38, change "qenerator" to --generator--.

Column 12, Line 39, change "beqinninq" to --beginning--.

Column 12, Line 46, change "maqnitude" to --magnitude--.

Signed and Sealed this

Twenty-sixth Day of June, 2007

JON W. DUDAS  
*Director of the United States Patent and Trademark Office*